United States Patent Office 3,637,584
Patented Jan. 25, 1972

3,637,584
STABILIZATION OF POLYOLEFINS
Ronald James Hurlock and Eric Samuel Nicholson, Manchester, England, assignors to Imperial Chemical Industries Limited, London, England
No Drawing. Filed May 19, 1969, Ser. No. 825,933
Claims priority, application Great Britain, May 30, 1968, 25,981/68
Int. Cl. C08f 45/60
U.S. Cl. 260—45.8 N    4 Claims

ABSTRACT OF THE DISCLOSURE

Poly-α-olefins derived from mono olefins containing three or more carbon atoms are stabilised against oxidative degradation by 1,3-imidazoles in which the 4 and 5 positions are substituted by aryl groups and the 2 position by a 2-hydroxyphenyl or 4,5-diaryl-1,3-imidazole group.

This invention relates to the stabilization of poly-α-olefins derived from monomers containing 3 or more carbon atoms against oxidative degredation by certain 2,4,5-triphenylimidazoles.

According to the invention there is provided a process for stabilising poly-α-olefins derived from monomers containing 3 or more carbon atoms against oxidative degradation which comprises incorporating into the polyolefin a phenylimidazole of the formula:

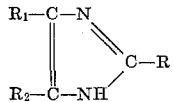

wherein $R_1$ and $R_2$ are each phenyl groups which may form part of a polynuclear system and R is a phenyl group substituted by a hydroxyl group or a group of the formula:

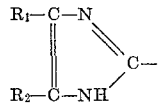

and which may be further optionally substituted by one or more halogen atoms or alkyl, aryl or alkoxy groups.

As poly-α-olefins containing 3 or more carbon atoms there may be mentioned for example atactic and isotactic polymers of propylene, butene - 1, 4 - methylpentene-1, 3 - methylbutene - 1, 3 - methylpentene - 1, 3 - methylhexene - 1, 4 - methylhexene - 1, and copolymers of these with each other or with minor amounts of other ethylenically unsaturated compounds, especially other olefins such as pentene-1, hexene-1, and dicene-1.

As polynuclear systems of which $R_1$ and $R_2$ may form part there may be mentioned for example the phenanthrene nucleus wherein the 9 and 10 carbon atoms are shared with the imidazole ring and retene (methylisopropylphenanthrene), chrysene, picene and pyrene. The preferred polynuclear system is phenanthrene.

As hydroxyl-substituted phenyl groups which may be represented by R there may be mentioned o-, m- and p-hydroxyphenyl, 3 - methoxy - 4 - hydroxyphenyl, 3,5-ditert. - butyl - 4 - hydroxyphenyl, 3,5 - dimethyl - 4 - hydroxyphenyl, 3 - methyl - 5 - tert - butyl - 4 - hydroxyphenyl and 3,5-di-isopropyl-4-hydroxyphenyl. As preferred substituted phenyl groups there may be mentioned 3,5-di-tert-butyl-4-hydroxyphenyl and o-hydroxyphenyl.

The phenylimidazole may be incorporated into the polyolefins by any conventional procedure, for example by dissolving the phenylimidazole in a voltatile solvent, mixing with the produced polyolefin, and removing the solvent by evaporation; by mixing the polyolefin and the phenylimidazole in powder form or by hot milling the components together or by extrusion compounding.

Suitable amounts of the phenylimidazole are from 0.01% to 2.0%, or preferably from 0.1% to 0.5%, of the weight of polyolefin.

The stabilising effect of the phenylimidazole is enhanced in many cases by the incorporation also into the polymer of other stabilisers, for example sulphides such as dilauryl or dioctadecyl thiodipropionate or thiodibutyrates, bis(2 - hydroxy - 5 - methylbenzyl)sulphide, bis(3 - tert. - butyl - 2 - hydroxy - 5 - methoxybenzyl) sulphide, 2,2' - dihydroxy-5,5'-dimethyl-diphenylsulphide, metal dialkyl dithiophosphates, metal dialkyldithiocarbamates, trialkyltrithiophosphites, phosphites such as trialkyl or triaryl phosphites or alkyl aryl phosphite, monoesters of phosphorous acid such as mono-2,2-(dihydroxymethyl) butyl phosphite and mono - 2,2' - di-(hydroxymethyl) propyl phosphite, or phenols such as 2,6-ditert.-butyl-4-methylphenol, 4,4' - thiobis(3-methyl-6-tert-butylphenol, 1,3,5 - trimethyl - 2,4,6 - tri(3',5'-ditert.-butyl-4-hydroxybenzyl) benzene, pentaerythrityl and octadecyl ester of β - 3,5 - ditert. - butyl - 4 - hydroxyphenylpropionic acid, phenol/aldehyde condensates, ultraviolet absorbing agents such as 2-hydroxybenzo-phenones, benztriazoles and nickel ketoximes in one, two or more component systems.

Suitable amounts of these other stabilisers are from 0.01 to 2% and preferably from 0.1 to 0.5% of the weight of polyolefin.

Other conventional additives may also be present in the polymer including other antioxidants, cross-linking agents, blowing agents, plasticisers, fillers, slip agents, antistatic agents, pigments and nickel and calcium soaps.

By the process of the invention effective protection is afforded against degradation caused by oxidation. Some of these antioxidants, unlike many other types, also give protection against high temperature degradation, i.e. give melt stabilization effects.

These compounds may be prepared for example from the appropriate α-diketone compound such as phenanthraquinone or benzil, by reaction of an aromatic aldehyde of formula R.CHO wherein R has the significance given earlier with aqueous ammonia or ammonium acetate and acetic acid at a temperature between 50° C. and 100° C. and conveniently between 90° C. and 100° C.

The invention is illustrated but not limited by the following examples in which all parts and percentages are by weight unless otherwise stated.

EXAMPLE 1

Stabilisers as listed in Table I below are dissolved in the minimum quantity of acetone, diluted with trichlorofluorethane (sufficient to ensure wetting of the polypropylene powder) and mixed with polypropylene powder. The powder is stirred at 50° C. under a slow current of air until dry (about 10 minutes) and then pressed at 180° C. for 3 minutes to give test sheets of 0.75 mm. thickness. The sheets are aged in a circulated air oven at 150° C. until embrittlement occurs, this being usually accompanied by development of opacity and discolouration.

TABLE I

| Stabiliser | Concentration (percent) | Hours to embrittlement |
|---|---|---|
| None | Nil | 3 |
| Dilaurylthiodipropionate (DLTP) | 0.5 | 12 |
| C | 0.5 | 30 |
| C<br>DLTP | 0.25<br>0.25 | 312 |
| D<br>DLTP | 0.25<br>0.25 | 120 |
| E | 1.0 | 48 |
| E<br>DLTP | 0.25<br>0.25 | 216 |
| F | 1.0 | 17 |
| F<br>DLTP | 0.25<br>0.25 | 300 |
| G | 1 | 712 |
| G<br>DLTP | 0.25<br>0.25 | 513 |
| H | 0.5 | 353 |
| H<br>DLTP | 0.25<br>0.25 | 395 |

C is 2-(2-hydroxyphenyl)-IH-phenanthro[9,10-d]imidazole
D is 2-(4-hydroxy-3-methoxyphenyl)-4,5-diphenylimidazole
E is 2-(2-hydroxyphenyl)-4,5-diphenylimidazole
F is 2,2'-p-phenylene-bis-(4,5-diphenylimidazole)
G is 2-(3,5-di-tert.-butyl-4-hydroxyphenyl)-4,5-diphenylimidazole
H is 2-(3,5-di-tert.-butyl-4-hydroxyphenyl)-IH-phenanthro[9,10-d)imidazole.

EXAMPLE 2

Stabilisers as listed in Table II ared issolved in 5 parts of ethanol, diluted with 45 parts of trichlorofluoroethane, and poured over 100 parts of finely powdered copolymer of 98% of 4-methylpentene-1 and 2% of n-decene-1 with stirring at 50° C. until all the solvent has been driven off. The powder mixture is moulded in a press at 260° C. for 1 minute to give a sheet of 2 mm. thickness. The sheet is cut into small pieces which are remoulded at 260° into a sheet. The process of cutting and remoulding is done three times to ensure uniform distribution of the stabilisers. The final sheet is cut into small pieces which are tested in a melt-flow grader at 280° C. using a 2Kg load and substandard die. After an initial period of heating without load, the load is put on and the amount of material extruded in 60 seconds is determined at 5 minute intervals. The results are shown in Table II. In this table a higher figure indicates a lower melt-viscosity and a lower figure a high melt-viscosity. Melt instability is shown by a decreasing melt-viscosity.

TABLE II

| Stabiliser in polymer | Percent | Weight in grams times 100 extruded in 60 seconds at 280° C. after 5 minutes preheating plus additional heating for the following minutes— | | | | |
|---|---|---|---|---|---|---|
| | | 1 | 5 | 10 | 15 | 20 |
| A | 0.25 | 5.34 | 15.46 | 38.3 | | |
| A<br>B | 0.25+<br>0.25 | 4.2 | 6.8 | 10.0 | 15.8 | 19.6 |

A is a commercial antioxidant sold under the name Irganox 1010. ("Irganox" is a registered trademark) having the formula

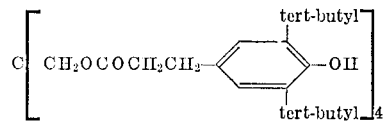

B is 2-(2-hydroxyphenyl)-IH-phenanthro[9,10-d]imidazole.

What we claim is:

1. A composition stabilized against oxidative degradation comprising a poly-α-olefin derived from a monomer containing 3 or more carbon atoms and a polynuclear imidazole of the formula

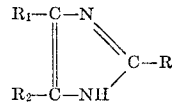

wherein $R_1$ and $R_2$ are each phenyl groups which form part of a polynuclear system selected from the group consisting of phenanthrene, retene, chrysene, picene and pyrene and R is a phenyl group substituted by a hydroxyl group or a group of the formula

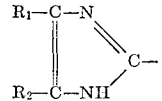

wherein $R_1$ and $R_2$ have the meanings given above and which may be further optionally substituted by one or more halogen atoms, or alkyl, aryl or alkoxy groups, said polynuclear imidazole being present in amounts of about 0.01–2.0% by weight of said poly-α-olefin.

2. A composition as claimed in claim 1 wherein R is a 3,5-ditert.-butyl-4-hydroxyphenyl or o-hydroxyphenyl group.

3. A composition as claimed in claim 1 wherein the amount of polynuclear imidazole is from 0.1 to 0.5% of the weight of polyolefin.

4. A composition as claimed in claim 1 which also contains a further stabilizer selected from the group consisting of dilauryl or dioctadecyl thiodipropionates or thiodibutyrates or hindered phenolic antioxidants in amounts of from 0.01 to 2.0% of the weight of polyolefin.

References Cited

UNITED STATES PATENTS

| | | | |
|---|---|---|---|
| 3,076,782 | 2/1963 | Mohr et al. | 260—45.8 |
| 3,205,083 | 9/1965 | Green | 106—176 |
| 3,218,276 | 11/1965 | Ringwald et al. | 260—23 |
| 3,484,400 | 12/1969 | Halek | 260—18 |
| 3,113,880 | 12/1963 | Hoeschele et al. | 106—187 |
| 3,118,887 | 1/1964 | Hardy et al. | 260—248 |
| 3,244,667 | 4/1966 | Burgess | 260—45.75 |
| 3,424,715 | 1/1969 | Kopacki et al. | 260—45.9 |
| 3,454,586 | 7/1969 | Suh | 260—294.9 |

DONALD E. CZAJA, Primary Examiner

R. A. WHITE, Assistant Examiner

U.S. Cl. X.R.

260—45.85, 45.95